United States Patent

Arai et al.

[11] Patent Number: 5,812,709
[45] Date of Patent: Sep. 22, 1998

[54] OPTICAL DEVICE HAVING SWITCHING FUNCTION

[75] Inventors: Hideaki Arai; Hisato Uetsuka; Kenji Akiba, all of Ibaraki, Japan

[73] Assignee: Hitachi Cable, Ltd., Tokyo, Japan

[21] Appl. No.: 656,384

[22] Filed: May 31, 1996

[30] Foreign Application Priority Data

Dec. 27, 1995 [JP] Japan .................................. 7-341468

[51] Int. Cl.$^6$ ............................................... G02B 6/26
[52] U.S. Cl. ............................................ 385/16; 385/18
[58] Field of Search ................................. 385/16, 17, 20, 385/30, 31, 120, 9, 10, 13, 14, 37

[56] References Cited

U.S. PATENT DOCUMENTS

| | | | |
|---|---|---|---|
| 4,673,270 | 6/1987 | Gordon | 385/16 |
| 4,978,189 | 12/1990 | Blonder et al. | 385/16 X |
| 5,283,785 | 2/1994 | Ferguson | 370/55 |
| 5,414,548 | 5/1995 | Tachikawa et al. | 359/130 |
| 5,438,445 | 8/1995 | Nakano | 359/124 |
| 5,448,660 | 9/1995 | Calvani et al. | 385/16 X |
| 5,457,758 | 10/1995 | Snitzer | 385/30 |
| 5,459,801 | 10/1995 | Snitzer | 385/30 |
| 5,488,500 | 1/1996 | Glance | 359/127 |
| 5,623,565 | 4/1997 | Blair et al. | 385/24 |

FOREIGN PATENT DOCUMENTS 4-114133  4/1992  Japan .
7-318987  12/1995  Japan .

OTHER PUBLICATIONS

Fukuoka, Fukuoka Institute of Technology Mar. 1995, Proceedings of the 1995 IEICE General Conference pp. 1–5.

Raman Kashyap, Photosensitive Optical fibers: Devices and Applications Jun. 1994, Optical Fiber Technology 1, pp. 17–34.

K. Okamoto et al. 16ch Optical Add/Drop Multiplexer using Silica–based Arrayed–Waveguide Grating Proceedings of the 1995 Institute of Electronics, information and Communication Engineers General Conference p. 254.

Tetsuro Komukai et al. Proceedings of the 1995 Institute of Electronics, Information and Communication Engineers General Conference, C–235, p. 235.

Primary Examiner—Akm E. Ullah
Attorney, Agent, or Firm—McDermott, Will & Emery

[57] ABSTRACT

An optical device having a switching function has a waveguide filter for switching whether input signal light of including at least one specific wavelength should be transmitted or reflected. The input signal lights of wavelength of $\lambda_1 \sim \lambda n$ are transmitted to the input waveguide. When the waveguide filter is off, the signal lights of all wavelength are transmitted to the output port. When the waveguide filter is on, the signal light of wavelength of $\lambda_2 \sim \lambda n$ are transmitted, but the signal light of wavelength of $\lambda_2$ is reversed and output to the drop port. If the thin film heaters are off, a signal light of wavelength of $\lambda_1$ is output (dropped) from the drop port. If the thin film heaters are on, it is reversed and transmitted to the output port.

9 Claims, 12 Drawing Sheets

OPTICAL DEVICE HAVING SWITCHING FUNCTION

BACKGROUND OF THE INVENTION

This invention relates to an optical device having a switching function, and more particularly to, an optical device which can be used as an Add/Drop filter or an Add/Drop switch.

An optical device having a switching function, such as an Add/Drop filter or an Add/Drop switch, is known as an optical device for accessing each channel of signal lights individually to add or drop the signal lights in optical wavelength division multiplexed communication systems.

A conventional Add/Drop filter comprises first to third arrayed-waveguide diffraction grating type optical multiplexers/demultiplexers for multiplexing and demultiplexing a plurality of signal lights of different wavelengths, an input port for inputting the signal lights to an input end of the first multiplexer/demultiplexer, an output port for outputting the signal lights from an output end of the second multiplexer/demultiplexer, a drop port for dropping at least one selected signal light from an output end of the third multiplexer/demultiplexer, a plurality of add ports for adding signal lights of predetermined different wavelengths independently from each add port, and a thermo-optic(T.O.) switch disposed between the output end of the first multiplexer/demultiplexer and the input ends of the second and third multiplexers/demultiplexers.

In operation, the T.O. switch is operated not only to change-over the signal lights from the first multiplexer/demultiplexer to be transmitted to the input end of the second multiplexer/demultiplexer and the third multiplexer/demultiplexer, but also the signal lights from the add ports to be transmitted to the input end of the second multiplexer/demultiplexer and reflected.

Such an Add/Drop filter and a T.O. switch are known in the literature and publication, for example, "16ch Optical Add/Drop Multiplexer using Silica-based Arrayed-Waveguide Grating" Proceedings of the 1995 Institute of Electronics, Information and Communication Engineers General Conference, page 254, and Japanese Patent Kokai No. 4-114133.

A conventional bandpass filter comprises a circulator to which an input optical fiber, an output optical fiber and an grating optical fiber are connected, wherein the grating optical fiber is provided with at least one grating thereon and an end plane at the end thereof.

In operation, when input signal lights are transmitted to the grating optical fiber through the circulator, only a light of specific wavelength is reflected by the grating and returned to the circulator to be output to the output optical fiber.

Such a bandpass filter is known in the literature, for example, "An in-line optical bandpass filter with fiber-gratings and an optical circulator" Proceedings of the 1995 Institute of Electronics, Information and Communication Engineers General Conference, C-235, page 235.

In the conventional Add/Drop filter, however, there is a disadvantage in that its characteristics are deteriorated, even if widths of cores of the arrayed-waveguides are slightly non-uniform, and refractive indices thereof are slightly fluctuated, because the characteristics of the multiplexers/demultiplexers are so sensitive to such structural parameters. Therefore, a process must be highly precise to fabricate an Add/Drop filter comprising a plurality of such multiplexers/demultiplexers on a substrate with a high yield.

Another disadvantage is that the conventional optical Add/Drop filter is large in size, because three of the first to third optical multiplexers/demultiplexers and the T.O. switch are integrated on a single substrate.

In the conventional bandpass filter, however, there is a disadvantage in that it can not be wavelength-tunable, when optical waveguides are used in place of the grating optical fiber.

SUMMARY OF THE INVENTION

Accordingly, it is an object of the invention to provide an optical device having a switching function by which the structure and fabrication process are simplified.

It is a further object of the invention to provide an optical device having a switching function by which deterioration of the characteristics caused by its fabrication process is eliminated, and productivity and quality become high.

It is a still further object of the invention to provide an optical device having a switching function by which the size thereof becomes smaller.

It is a still yet further object of the invention to provide an optical device having a switching function by which the number of channels becomes easy to extend.

According to the first feature of the invention, an optical device having a switching function, comprises:

a waveguide filter for switching an input signal light of including at least one specific wavelength to be transmitted or reflected therein;

a first circulator having an input port for inputting said input signal light to the waveguide filter, and a drop port for outputting the reflected signal light; and a second circulator having an output port for outputting the transmitted signal light, and an add part for inputting an add signal light of the specific wavelength.

According to the second feature of the invention, an optical device having a switching function, comprises:

an input waveguide and an output waveguide, the input waveguide and the output waveguide being partially disposed to be adjacent each other, thereby forming a 3 dB coupler, a waveguide filter comprising a pair of gratings and phase shift switches provided on extending parts of both input waveguide and output waveguide extended from the 3 dB coupler; and a reflecting film disposed on ends of both input waveguide and output waveguide.

According to the third feature of the invention, an optical device having a switching function, comprised:

first and second waveguides, the first and second waveguides being partially disposed to be adjacent to each other, thereby forming a 3 dB coupler, first and second gratings provided on the first and second waveguides at one end from said 3 dB coupler, respectively, so as to reflect a signal light of a specific wavelength, third and fourth gratings provided on the first and second waveguides at a back stage of the first and second gratings, respectively, so as to reflect remaining signal lights except for the signal light of a specific wavelength; and first and second phase controllers provided on the first and second waveguides, respectively, for controlling phase of a transmitting light.

BRIEF DESCRIPTION OF THE DRAWINGS

The invention will be explained in more detailed in conjunction with the appended drawings, wherein.

DESCRIPTION OF THE PREFERRED EMBODIMENTS

Before explaining an optical device having a switching function in the first preferred embodiment, the aforementioned conventional connecting structures will be explained in FIGS. 1, 2 and 3.

Figure 1:
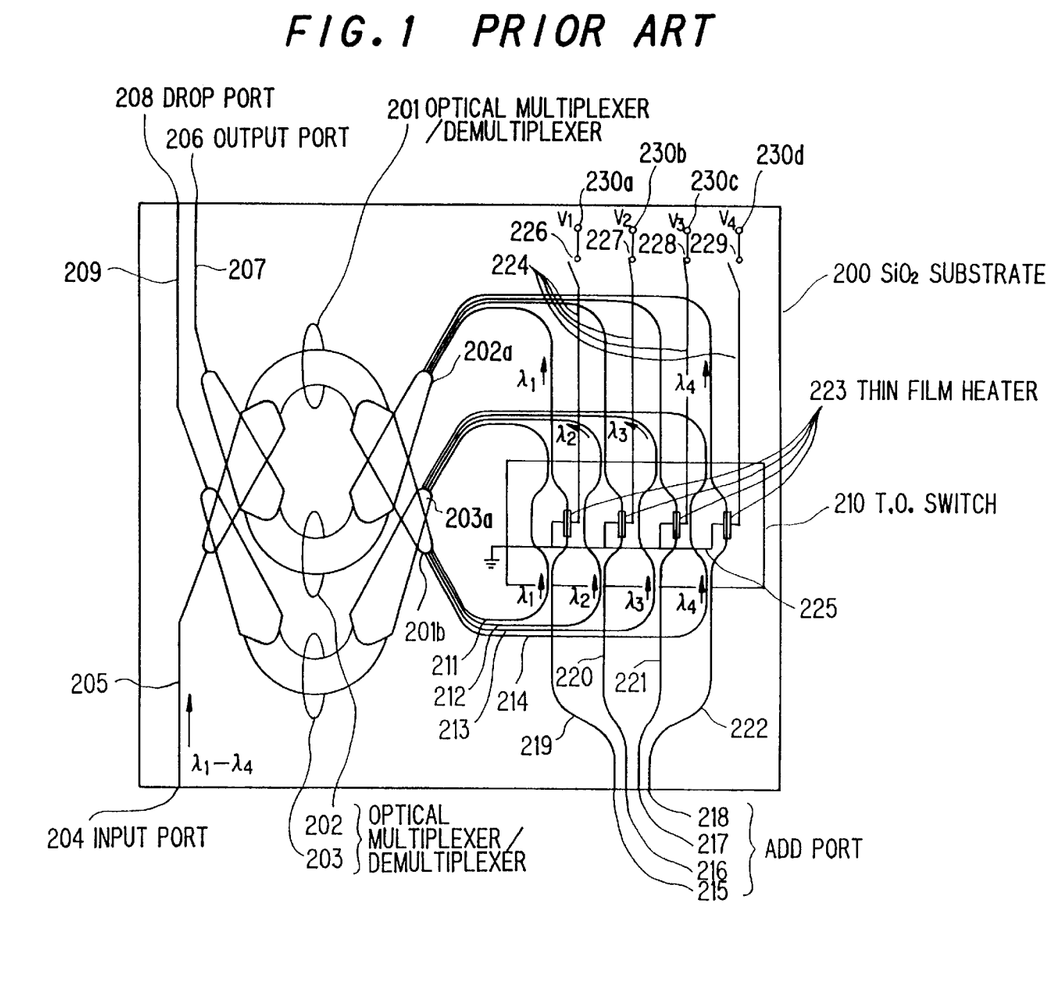
FIG. 1 is a plane view showing a conventional Add/Drop filter.

FIG. 1 shows the conventional Add/Drop filter formed on a single SiO2 substrate, which may switch four different signal lights, whose center wavelengths are $\lambda_1, \lambda_2, \lambda_3$ and $\lambda_4$, respectively.

The Add/Drop filter comprises a first, second and third optical multiplexers/demultiplexers 201, 202 and 203 having the same arrayed-waveguide diffraction grating type structure for multiplexing and demultiplexing signal lights of different wavelengths of $\lambda_1, \lambda_2, \lambda_3$ and $\lambda_4$, an input port 204 for inputting those signal lights to an input end of the first multiplexer/demultiplexer 201 through a waveguide 205, an output port 206 for outputting the signal lights form an output end of the second multiplexer/demultiplexer 202 through a waveguide 207, a drop port 208 for dropping at least one selected signal light from an output end of the third multiplexer/demultiplexer 203 through a waveguide 209, add ports 215, 216, 217 and 218 for adding signal lights of wavelengths of $\lambda_1, \lambda_2, \lambda_3$ and $\lambda_4$ from each add port through waveguides 219, 220, 221 and 222, respectively, to the output port 206 or the drop port 208, and a T.O. switch 210 disposed between an output end 201b of the first multiplexer/demultiplexer 201 and input ends 202a, 203a of the second and third multiplexers/demultiplexers 202, 203.

As shown in FIG. 1, optical multiplexers/demultiplexers 201, 202 and 203 are formed to occupy half part of the SiO$_2$ substrate 200, and the T.O. switch 210 are positioned to be adjacent to those optical multiplexers/demultiplexers at the remaining part of the SiO$_2$ substrate 200. The T.O. switch includes four switching systems, which is provided with four waveguides 211, 212, 213 and 214, part of which are formed in parallel with each other and both ends of which are connected to the output end 201b of the first optical multiplexer/demultiplexer 201 and the input end 203a of the third optical multiplexer/demultiplexer 203, respectively. Another four waveguides 219, 220, 221 and 222, part of which are parallel with each other and partially positioned to be adjacent to the waveguide 211, 212, 213 and 214, are also provided so as to form directional couplers. Both ends of the waveguide 219, 220, 221 and 222 are connected to input end 202a of the second optical multiplexer/demultiplexer 202 and the add port 215, 216, 217 and 218 which are formed at the side plane of the SiO$_2$ substrate 200, respectively. The T.O. switch 210 also includes thin film heaters 223 disposed on each waveguides 219, 220, 221 and 222, copper wires 224 for supplying electric power to each thin film heaters 223 individually, and a ground line 225 for commonly connecting electrodes of the thin film heaters to ground. Electric switches 226, 227, 228 and 229, and power source terminals 230a, 230b, 230c and 230d with voltages of $V_1$, $V_2$, $V_3$ and $V_4$, are connected to the copper wire 224, respectively.

In operation, signal lights of wavelengths of $\lambda_1, \lambda_2, \lambda_3$ and $\lambda_4$ are input to the first optical multiplexer/demultiplexer 201 from the input port 204, and demultiplexed into four separate signal lights, then transmitted to waveguides 211, 212, 213 and 214, respectively. At the T.O. switch 210, depending on "on/off" state of the thin film heaters 223, light paths in which the signal lights is to be transmitted may be changed each signal light to be input to the third optical multiplexer/demultiplexer 203 and the second optical multiplexer/demultiplexer 202.

As the state shown in FIG. 1 indicates that switches 230a and 230d are off and switches 230b and 230c are on, signal lights of wavelength of $\lambda_1$ and $\lambda_4$ are input to the second optical multiplexer/demultiplexer 202, and rest of $\lambda_2$ and $\lambda_3$ are input to the third optical multiplexer/demultiplexer 203. After being multiplexed, the signal lights multiplexed at the second optical multiplexer/demultiplexer 202 are output to the output port 206, and those multiplexed at the third multiplexer/demultiplexer 203 are dropped to the drop port 208.

When signal lights of $\lambda_1, \lambda_2, \lambda_3$ and $\lambda_4$ are input from the add ports 215, 216, 217 and 218, respectively, they are multiplexed at the second optical multiplexer/demultiplexer 202 and output from the output port 206 (i.e. added) only if the thin film heaters are on.

Figure 2:
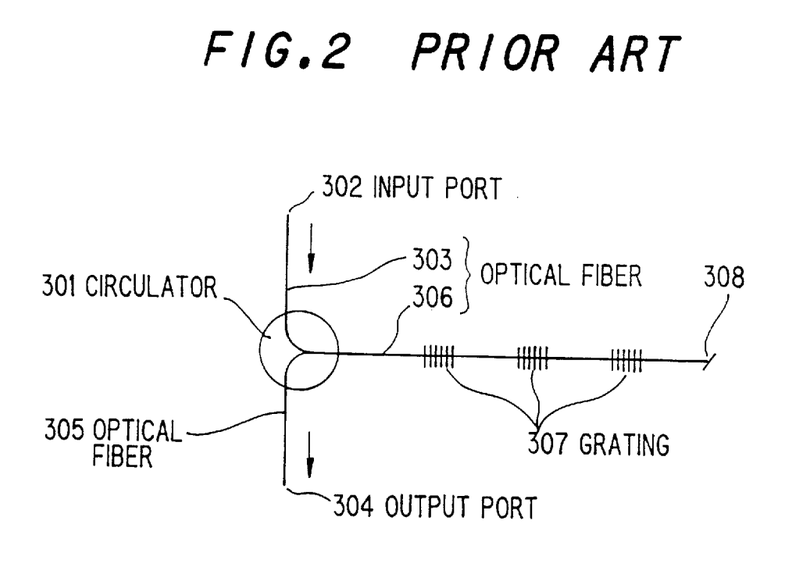
FIG. 2 is a plane view showing a conventional bandpass filter.
Figure 3:
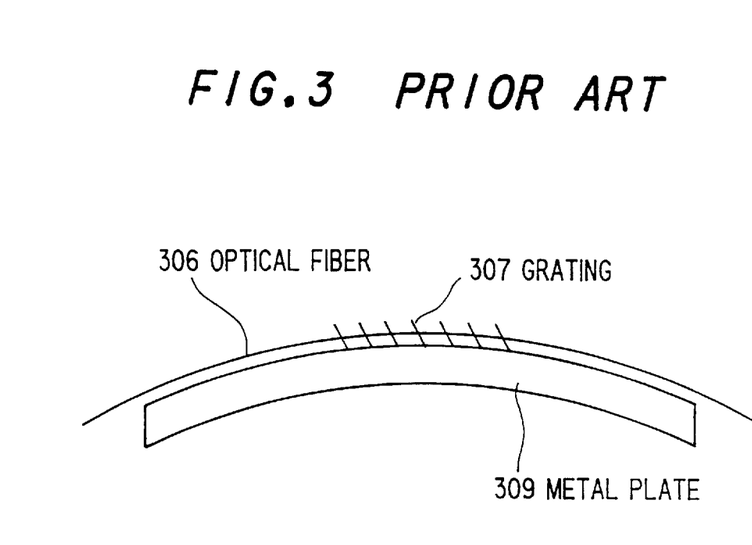
FIG. 3 is a cross-sectional view showing a peripheral structure of the optical fiber grating used in the conventional bandpass filter shown in FIG. 2.

FIG. 2 shows the conventional optical device as a bandpass filter using fiber-gratings, which comprises a circulator 301 to which an input optical fiber 303, an output optical fiber 305 and an grating optical fiber 306 are connected, wherein the grating optical fiber 306 is provided with gratings 307 thereon and an end thereof has an end plane 308. Such gratings 307 may be structured, as shown in FIG. 3 for example, by setting the grating optical fiber 306 on a metal plate 309 and bending together so as to change the Bragg reflection wavelength by varying the period of gratings, so that a tunable bandpass filter may be obtained.

In operation, when signal lights are input from a input port 302, and transmitted to the grating optical fiber 306 through the circulator 301, only a light of specific wavelength is reflected by the gratings 307 and output to an output port 304 through the output optical fiber 305.

In the conventional Add/Drop filter, however, there is disadvantage, as mentioned before, in that its characteristics are deteriorated, even if widths of cores of the arrayed-waveguides are slightly non-uniform, and refractive indices thereof are slightly fluctuated, because the characteristics of the multiplexers/demultiplexers are so sensitive to such structural parameters. Therefore, a process must be highly precise to fabricate an Add/Drop filter comprising a plurality of such multiplexers/demultiplexers on a substrate with a high yield.

Another disadvantage is that the conventional Add/Drop filter is large in size. For example, it is approximately 85×60 mm$^2$ to integrate three of first to third multiplexers/demultiplexers and the T.O. switch on a single substrate as shown in FIG. 1.

Further more, in the conventional bandpass filter shown in FIG. 2, there is a disadvantage in that it can not be wavelength-tunable, when optical waveguides are used in place of the grating optical fiber.

Next, an optical device having a switching function as an Add/Drop filter in the first preferred embodiment will be explained in FIG. 4.

In the first preferred embodiment, the Add/Drop filter is provided with a first and second circulator 101, 102, and a waveguide filter 103 connected between them by optical fiber 104, 105. An input port 106 and a drop port 107 are connected to the first circulator 101 by optical fibers 108, 109, respectively. In the same manner, an output port 110 and an add port 112 are connected to the second circulator 102 by optical fibers 111, 113. For the embodiment, dispersion-shifted optical fibers may be used as optical fibers.

The waveguide filter 103 is provided with a SiO$_2$ substrate 114, a 3 dB coupler 115 which is formed by an input waveguide 116 and an output waveguide 117 of silica glass at the center of the SiO$_2$ substrate 114, a first grating 118 to be formed on extending part of the input waveguide 116 from the 3 dB coupler 115, a first thin film heater 119 (sometimes referred to as "phase shift switch" hereafter) which is positioned to be adjacent to but separated from the first grating 118 so as not to thermally influence the first grating 118, a second thin film heater 120 ("phase shift switch") which is also positioned to be adjacent to but separated from a second grating 121, both of which are formed on extending part of the output waveguide 117 from the 3 dB coupler 115, and a reflecting film 122 disposed on both side plane of the SiO2 substrate 114 and end planes of the input and output waveguides 116, 117.

In the embodiment, the gratings 118, 121 are designed so as to reflect the signal light of specific wavelength $\lambda_1$, 1556 nm for example. The thin film heaters 119, 120 may be produced by using Ta$_2$N film. The 3 dB coupler 115 is a directional coupler type. The reflecting film 122 are formed by vapor-depositing a gold on both end planes of the input and output waveguides 116, 117, and the side plane of the SiO$_2$ substrate 114.

In order to supply electric power to the thin film heaters 119, 120, copper wires 123, 124, 125 and 126 are wired and a DC power source 127 and a electric switch 128 are connected in series between two common connecting points of those copper wires.

Figure 4:
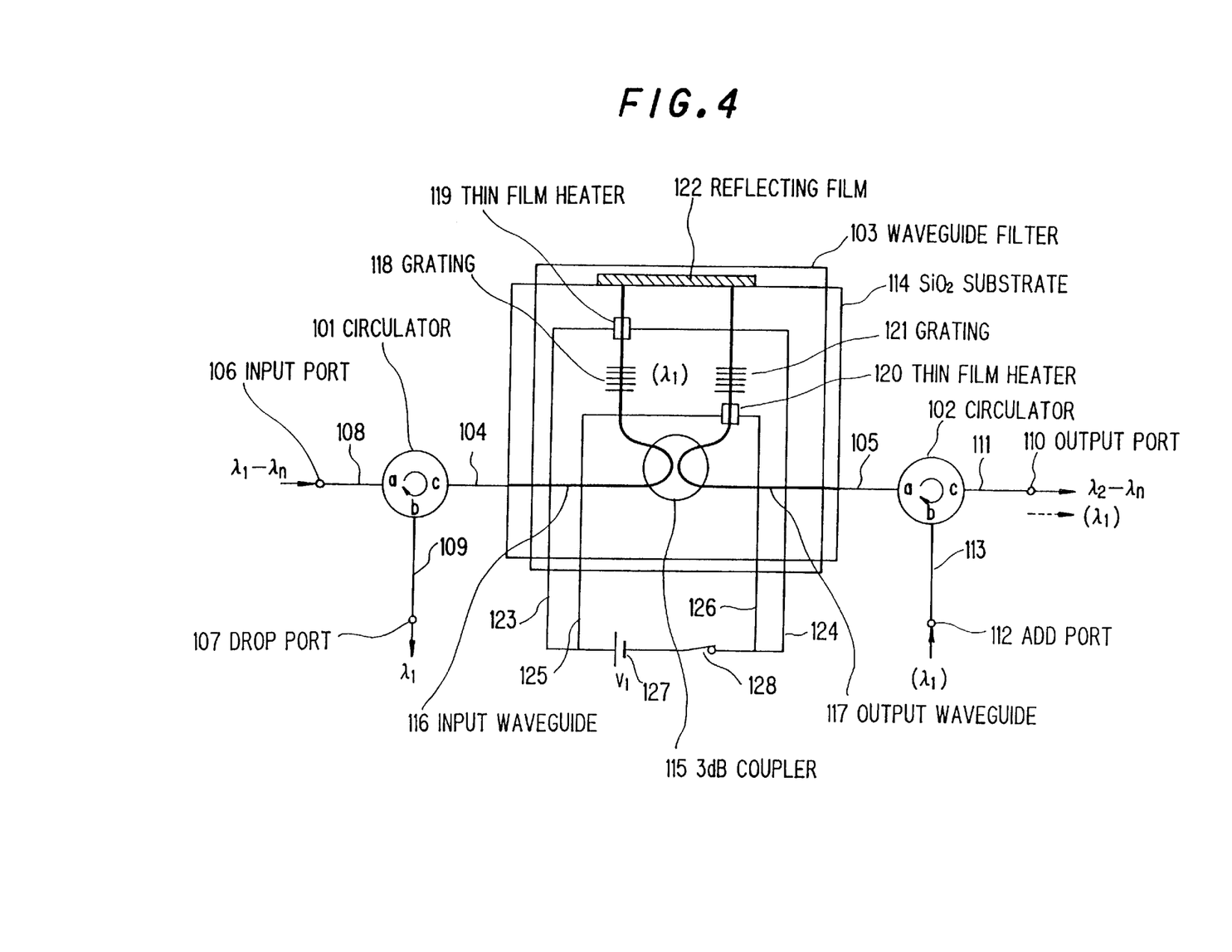
FIG. 4 is a plane view showing an optical device having a switching function in a first preferred embodiment according to the invention.

Next, before explaining the operation of the optical device shown in FIG. 4, the operation of the waveguide filter 103 will be explained in FIGS. 5A, 5B and 5C.

Figure 5A:
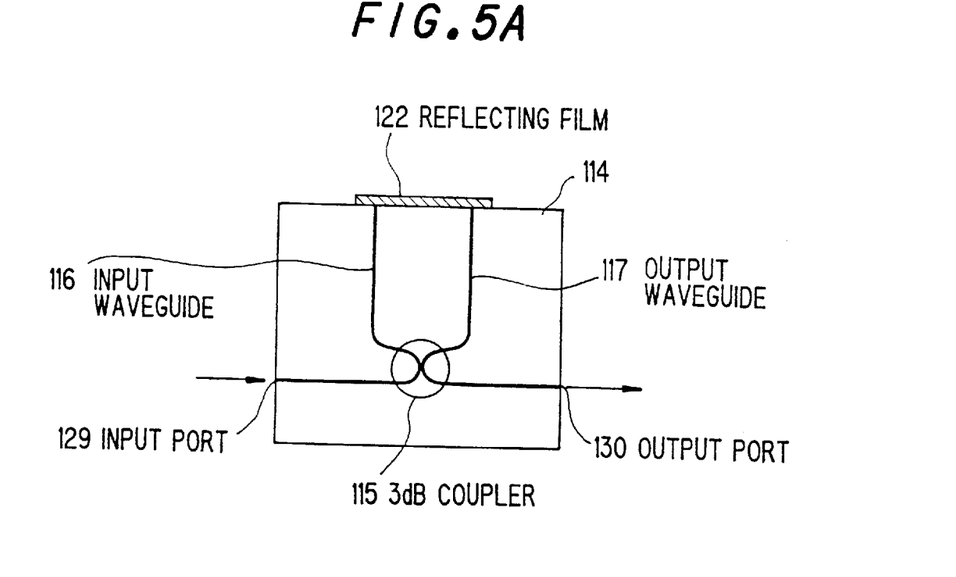
FIGS. 5A, 5B and 5C are explanatory vies showing equivalent optical circuits for the optical device shown in FIG. 4 as a connecting structure itself at off-state of the thin film heaters, and its developments at on-state thereof for the signal lights of wavelength of $\lambda_2 \sim \lambda n$, and $\lambda_1$, respectively.

FIG. 5A shows an equivalent optical circuit of the waveguide filter 103 at on-state of the thin film heaters 119, 120, wherein an input port 129 and an output port 130 are provided. FIG. 5B shows an equivalent optical circuit which represents the forward and backward signal light paths reflected by the reflecting film 122, which is developed by putting the reflecting film 122 at the center of the SiO$_2$ substrate 114. In this optical circuit, an input signal light from the input port 129$a$ is transmitted and output to the output port 130$b$.

Figure 5B:
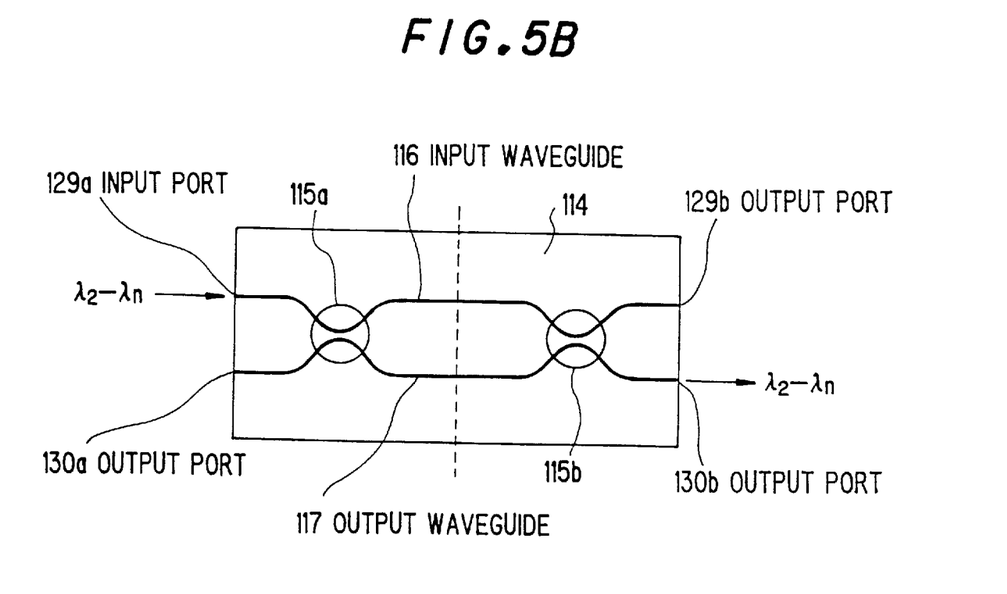
Figure 5C:
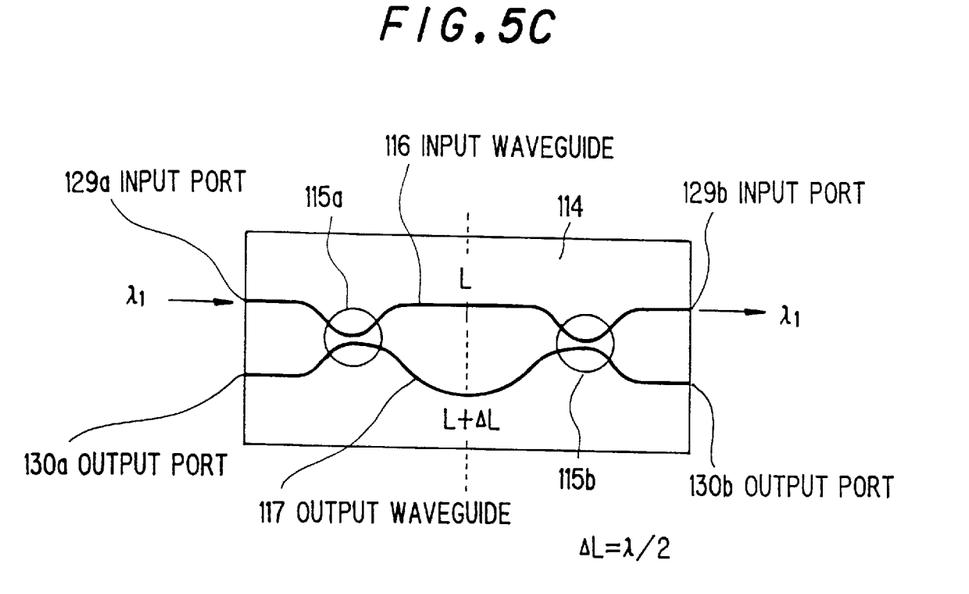

At on-state of the first and second thin film heaters 119, 120, the signal lights of wavelength of $\lambda_2$~$\lambda$n which are input from the input port 129$a$ are transmitted and output to the output port 130$b$, because, for such signal lights, both sides of the output waveguide 117 (shown in FIG. 4) are equivalently elongated by the same length, and equivalent optical circuit thereof is considered as the same as that shown in FIG. 5B. On the other hand, for the signal light of wavelength of $\lambda_1$, only part of the waveguide between the second thin film heater 120 and the reflecting film 122 is equivalently elongated by $\lambda_1/4$ through its forward transmission, then, it is totally elongated by $\lambda_1/2$ (i.e. a phase of $\pi$) through both forward and backward transmissions. Therefore, the equivalent optical circuit of such waveguide filter may be considered as the same as a Mach-Zehnder Interferometer (MZI) having an equivalent optical path length difference of $\lambda/2$, as shown in FIG. 5C. Therefore, the input signal light of $\lambda_1$, which is input from the input port 129$a$, is reflected and transmitted backward to the input port 129$b$.

Figure 6:
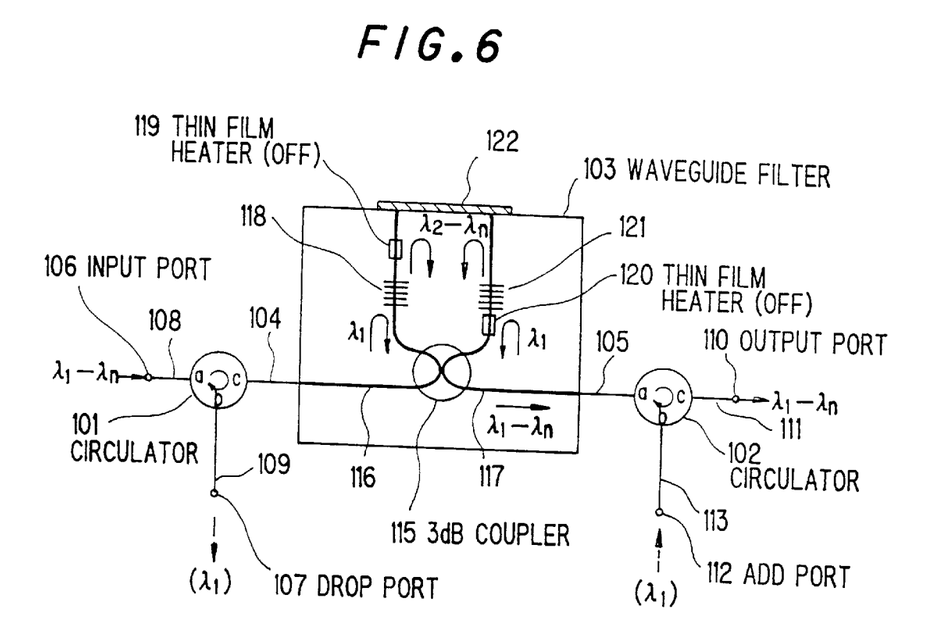
FIGS. 6, 7 are explanatory views showing signal lights paths in the optical device having a switching function shown in FIG. 4 at off-state of the thin film heaters, and on-state thereof, respectively.

Now, the operation of the first embodiment of an optical device having a switching function according to the invention shown in FIG. 4 will be explained in FIGS. 6 and 7, wherein like parts are indicated by like reference numerals as used in FIG. 4. The input signal lights of wavelength of $\lambda_1$~$\lambda$n which are input from the input port 106 are transmitted through the optical fiber 108, the first circulator 101, and the optical fiber 104, and input to the input waveguide 116. At off-state of the thin film heaters (i.e. when the waveguide filter 103 is off), the signal lights of all wavelength are transmitted through the output waveguide 117, the optical fiber 105, the circulator 102, the optical fiber 111, and output to the output port 110, as shown in FIG. 6.

Figure 7:
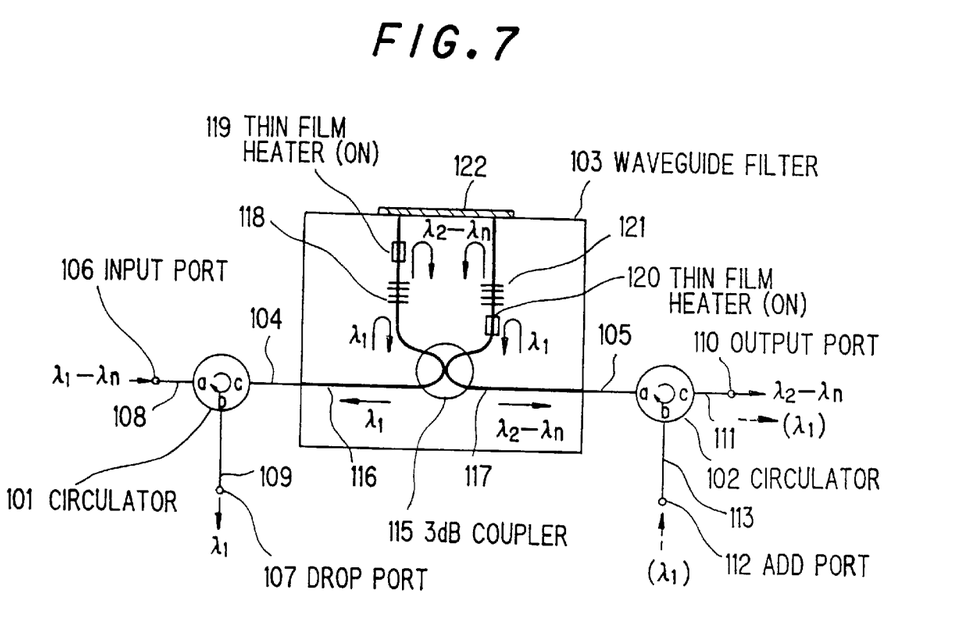

On the other hand, at on-state of the thin film heaters (i.e. when the waveguide filter 103 is on), as shown in FIG. 7, the signal light of wavelength of $\lambda_2$~$\lambda$n are transmitted in the same manner when the waveguide filter is off, but the signal light of wavelength of $\lambda_1$ is reversed and transmitted through the optical fiber 104, the circulator 101, and output to the drop port 107.

When a signal light of wavelength of $\lambda_1$ is input from the add port 112, it is transmitted to the output waveguide 117 through the optical fiber 113, the second circulator 102 and the optical fiber 105. If the thin film heaters are off, the signal light is transmitted through the 3 dB coupler 115, the input waveguide 116, the optical fiber 104, the first circulator 101 and the optical fiber 109, then output (dropped) from the drop port 107, as shown in FIG. 6.

On the contrary, if the thin film heaters are on, the signal light is reversed, because the signal light transmitting through the output waveguide 117 is shifted in its phase by the thin film heater 120 and prevented from passing through the 3 dB coupler 115. Then, it is transmitted to the output port 110 through the optical fiber 105, the circulator 102 and optical fiber 111, as shown in FIG. 7.

Figure 8:
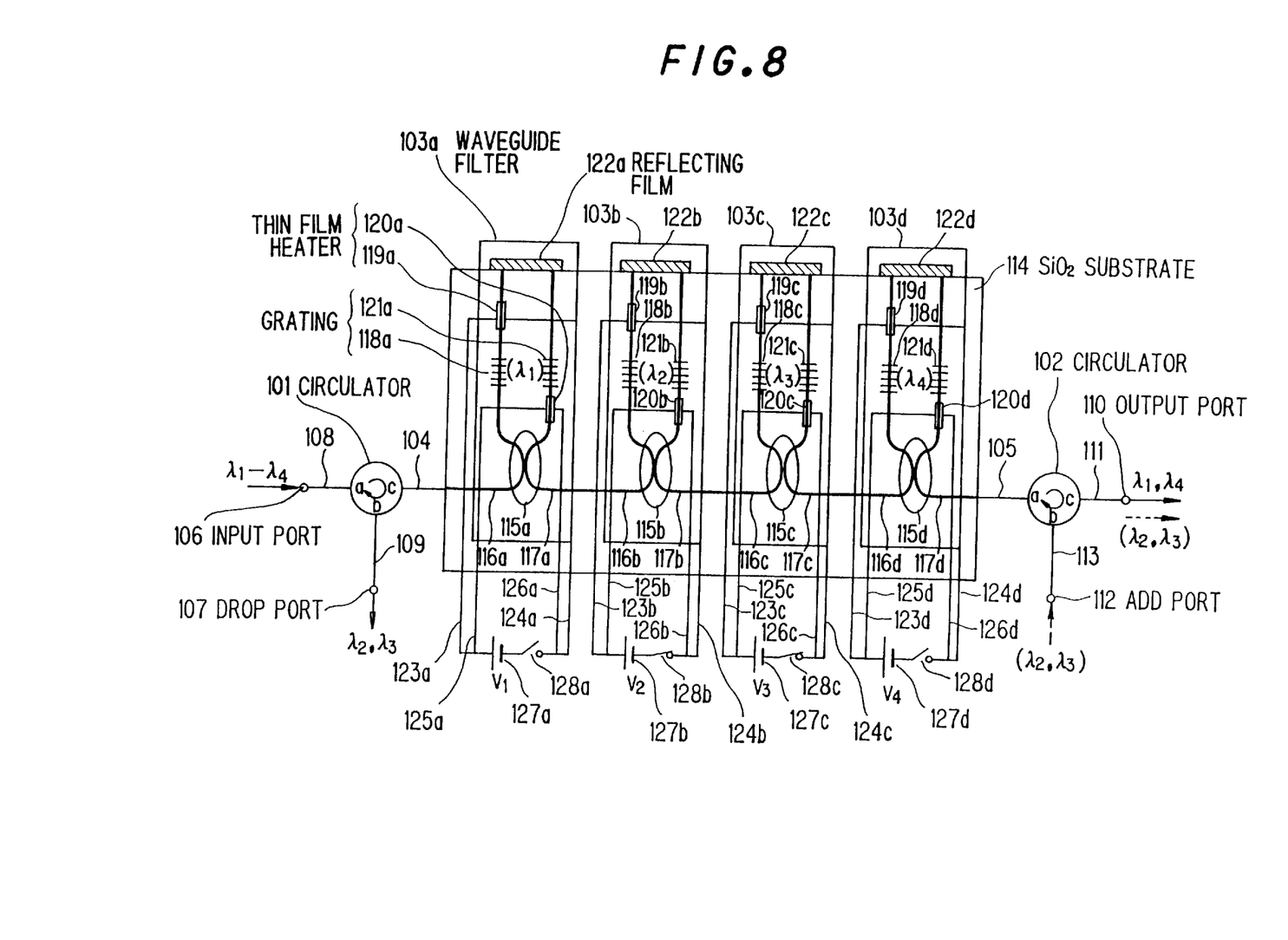
FIG. 8 is a plane view showing an optical device having a switching function in a second preferred embodiment according to the invention.

FIG. 8 shows an optical device having a switching function in the second preferred embodiment according to the invention, wherein like parts are indicated by like reference numerals as used in FIG. 4. The second preferred embodiment is designed to be able to switch signal lights of four different wavelengths arbitrarily. It is provided with four waveguide filters 103a, 103b, 103c and 103d, which are connected in series through each 3 dB couplers 115a, 115b, 115c and 115d on a single $SiO_2$ substrate 114, and a first and second circulators 101, 102 which are connected to an input waveguide 116a of the waveguide filter 103a and to an output waveguide 117d of the waveguide filter 103d, respectively. In the embodiment, the waveguide filter 103a is designed to be able to switch a signal light of wavelength of $\lambda_1$. In the same manner, each remaining waveguide filter 103b, 103c or 103d is designed for switching a specific signal light of $\lambda_2$, $\lambda_3$ or $\lambda_4$, respectively. It is understood that more channels of signal lights of different wavelengths may be switched by extending the number of such waveguide filters.

In the embodiment shown in FIG. 8, signal lights of wavelengths of $\lambda_1$=1556 nm, $\lambda_2$=1557 nm, $\lambda_3$=1558 nm and $\lambda_4$=1559 nm are input from the input port 106 at off-state of the thin film heaters 119a, 120a, 119d and 120d and at on-state of the thin film heaters 119b, 120b, 119c and 120c (i.e. when switches 128a and 127d are off, and switches 128b and 128c are on). The result shows that signal lights of wavelengths of $\lambda_2$ and $\lambda_3$ are output from the output port 110 with less than 2 dB loss, and, the cross-talks are less than −20 dB. In addition to that, the size of the waveguide filters is to be 30×60 mm², which is less than half as large as that of the conventional waveguide filter having the same function.

Figure 9:
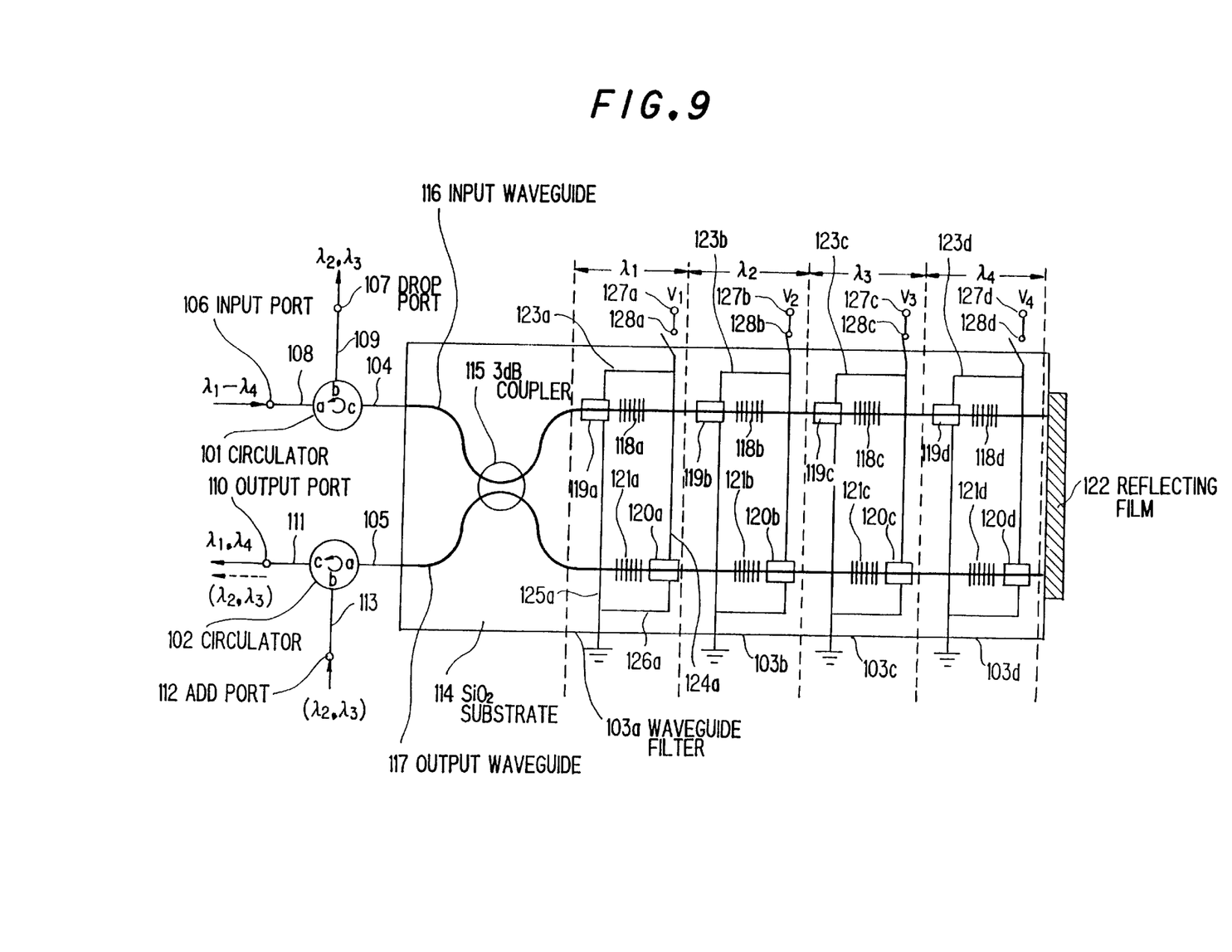
FIG. 9 is a plane view showing an optical device having a switching function in a third preferred embodiment according to the invention.

FIG. 9 shows an optical device having a switching function in the third preferred embodiments according to the invention, wherein like parts are indicated by like reference numerals as used in FIG. 8. In the third preferred embodiment, a 3 dB coupler 115, four waveguide filters 103a, 103b, 103c and 103d, and a reflecting film 122 are fabricated and connected in series on a single $SiO_2$ substrate 114, so as to be operated as the optical device having the same function as that in the second preferred embodiment shown in FIG. 7. According to the embodiment, it is noted that the device in further smaller size is provided than the device shown in FIG. 8, i,e., 10×60 mm², for example, which is less than approximately one eighth (⅛) of the conventional device having the same function.

Figure 10:
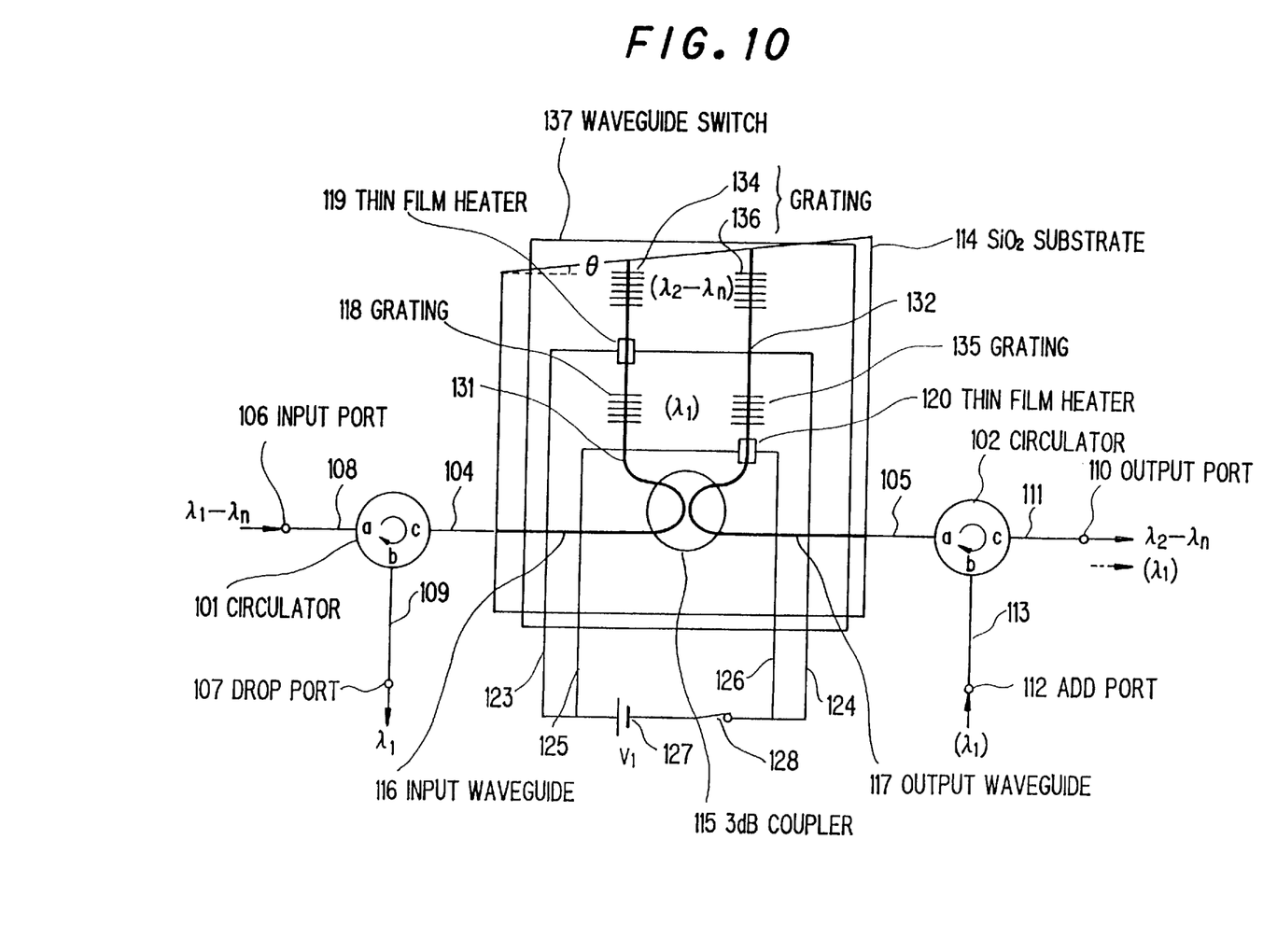
FIG. 10 is a plane view showing an optical device having a switching function in a fourth preferred embodiment according to the invention.

FIG. 10 shows an optical device having a switching function in the forth preferred embodiment according to the invention, wherein like parts are indicated by like reference numerals as used in FIG. 4. In the embodiments, in comparison with the optical device having a pair of gratings and thin film heaters between the 3 dB coupler 115 and the reflecting film 122 in the first preferred embodiment shown in FIG. 4, no reflecting film is provided but two gratings are connected in series along each waveguide, respectively.

As shown in FIG. 10, a waveguide switch 37 comprises an input and output waveguides 116, 117, a 3 dB coupler 115, waveguides 131, 132 extending from the input and and output waveguide 116, 117 between the 3 dB coupler 115 and the side plane of a $SiO_2$ substrate 114, respectively, a first and third gratings 133, 134 and a first thin film heater (phase controller) 119 which are provided on the waveguide 131, and a second and fourth gratings 135, 136 and a second thin film heater (phase controller) 120 which are provided on the waveguide 132. In such structure, a inclined side plane by θ degree against the longitudinal direction of the waveguides 131, 132 is preferably provided at the side plane of the $SiO_2$ substrate 114.

In operation, the first and second gratings 133, 135 are designed to reflect a signal light of wavelength of $\lambda_1$, and the third and fourth gratings 134, 136 are designed to reflect remaining signal lights (of wavelength of $\lambda_2$~$\lambda$n) which are not reflected by the first and second gratings 133, 135. When the first and second thin film heaters 119, 120 are off, the waveguide switch 137 has the same function as the optically equivalent circuit shown in FIG. 5A. In the same manner, when the first and second thin film heaters are on, the equivalent optical circuits are considered as the same as those shown in FIGS. 5B, 5C, just by substituting the third and fourth gratings 134, 136 for the reflecting film 122. The detailed explanation is to he referred to that part, therefore it is omitted hereon.

Figure 11:
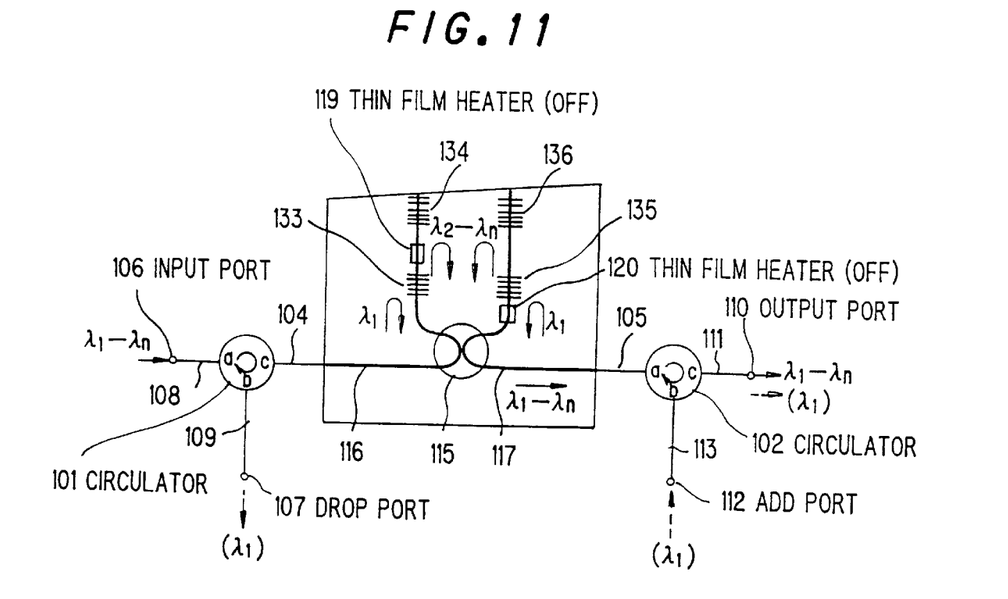
FIGS. 11, 12 are explanatory views showing signal lights paths in the optical device having a switching function shown in FIG. 10 at off-state of the thin film heaters, and on-state thereof, respectively.

Next, the operation of the optical device shown in FIG. 10 will be explained in FIGS. 11 and 12.

The input signal lights of wavelength of $\lambda_1$~$\lambda$n which are input from the input port 106 are transmitted through the optical fiber 108, the first circulator 101 and the optical fiber 104, then input to the input waveguide 116. At off-state of the thin film heaters 119, 120 (i.e. when the waveguide switch 137 is off), the signal lights of all wavelength are transmitted through the output waveguide 117, the optical fiber 105, the second circulator 102 and the optical fiber 111, then output from the output port 110, as shown in PIG. 11.

Figure 12:
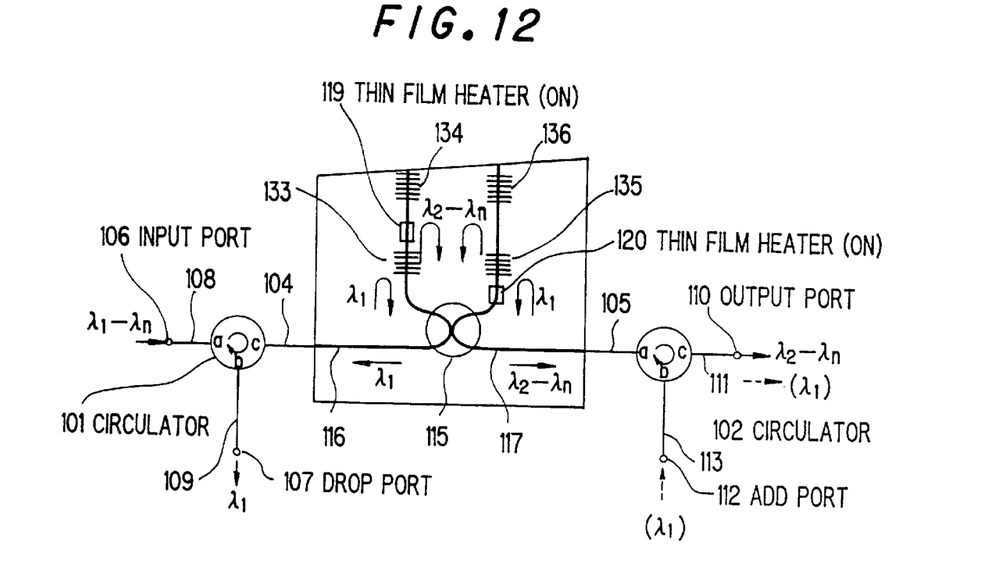

On the other hand, at on-state of the thin film heaters 119, 120 (i.e. when the waveguide switch 137 is on), as shown in FIG. 12, the signal light of wavelength of $\lambda_2$~$\lambda$n are transmitted in the same manner when the waveguide filter is off. However the signal light of wavelength of $\lambda_1$ is reversed and transmitted through the optical fiber 104, and the first circulator 101 to be then output to the drop port 107.

When a signal light of wavelength of $\lambda_1$ is input from the add port 112, it is transmitted to the output waveguide 117 through the optical fiber 113, the second circulator 102 and the optical fiber 105. It the thin film heaters 119, 120 are off, the signal light is transmitted through the 3 dB coupler 115, the input waveguide 116, the optical fiber 104, the first circulator 101 and the optical fiber 109, then output (dropped) from the drop port 107, as shown in FIG. 11. On the contrary, if the thin film heaters 119, 120 are on, the signal light is reversed and transmitted to the output port 110 through the optical fiber 105, the second circulator 102 and optical fiber 111, as shown in FIG. 12.

Figure 13:
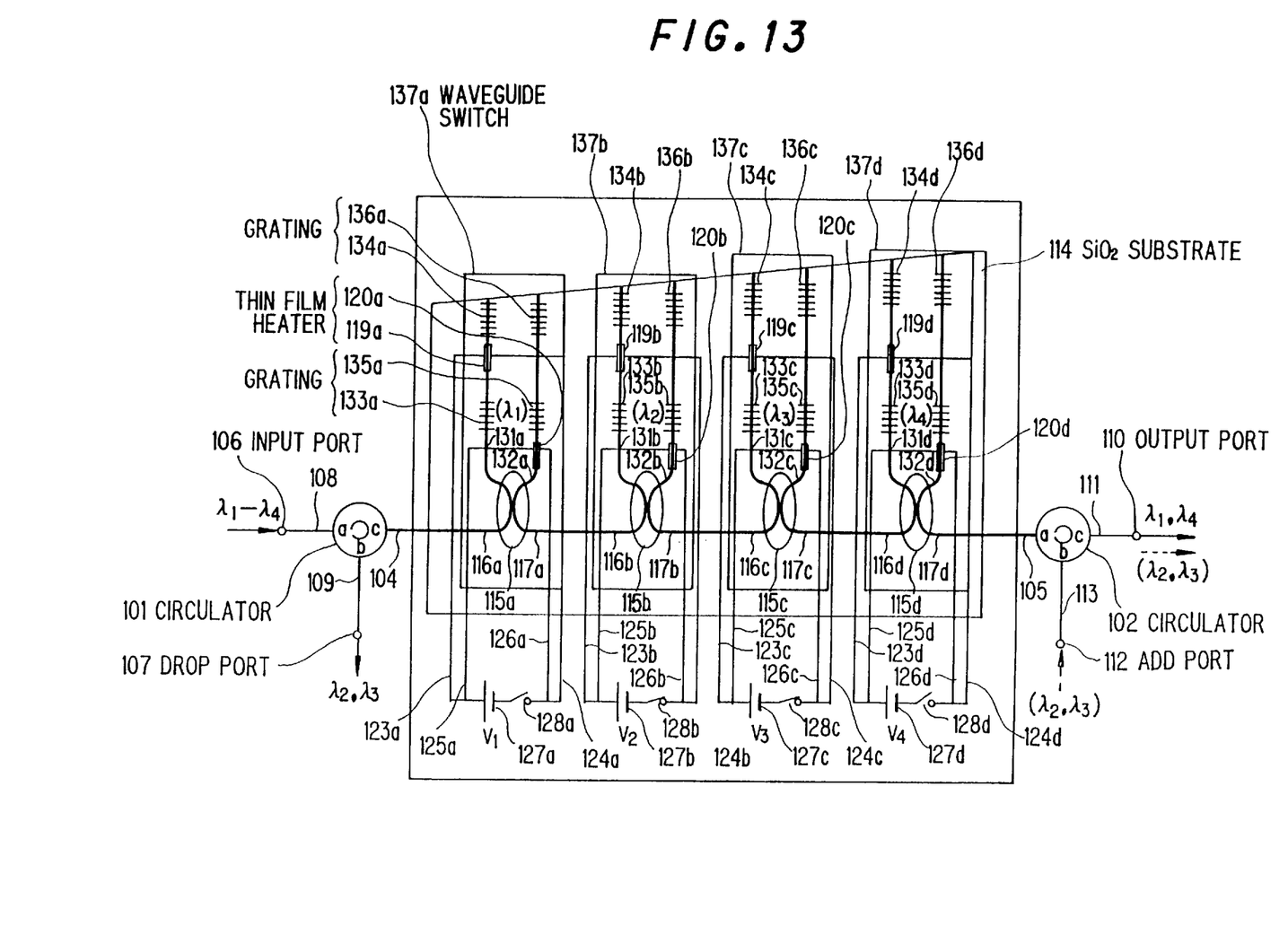
FIG. 13 is a plane view showing an optical device having a switching function in a fifth preferred embodiment according to the invention.

FIG. 13 shows an optical device having a switching function in the fifth preferred embodiment according to the invention, wherein like parts are indicated by like reference numerals as used in FIG. 10. In the fifth preferred embodiment, the optical device having a switching function is designed to be able to switch signal lights of four different wavelengths arbitrarily. It is provided with four waveguide switches 137a, 137b, 137c and 137d, which are connected in series through each 3 dB couplers 115a, 115b, 115c and 115d on a single $SiO_2$ substrate 114, and a first and second circulators 101, 102 which are connected to an input waveguide 116a of the waveguide switch 137a and to an output waveguide 117d of the waveguide switch 137d, respectively. In the embodiment, the waveguide switch 137a is designed to be able to switch a signal light of wavelength of $\lambda_1$. In the same manner, each remaining waveguide switch 137b, 137c or 137d is designed for switching a specific signal light of $\lambda_2$, $\lambda_3$ or $\lambda_4$, respectively.

In the embodiment shown in FIG. 13, signal lights of wavelengths of $\lambda_1$=1556 nm, $\lambda_2$=1557 nm, $\lambda_3$=1558 nm and $\lambda_4$=1559 nm are input from the input port 106 at off-state of the thin film heaters 119a, 120a, 119d and 120d, and on-state of the thin film heaters 119b, 120b, 119c and 120c (when switches 128a and 127d are off, and switches 128b and 128c are on), The result shows that signal lights of wavelengths of $\lambda_2$ and $\lambda_3$ are output from the output port 110 with less than 2 dB loss, and the cross-talks are less than −20 dB. In addition to that, the size of the waveguide filters is to be 30×60 mm² large, which is less than half as large as that of the conventional waveguide filter having the same function.

Figure 14:
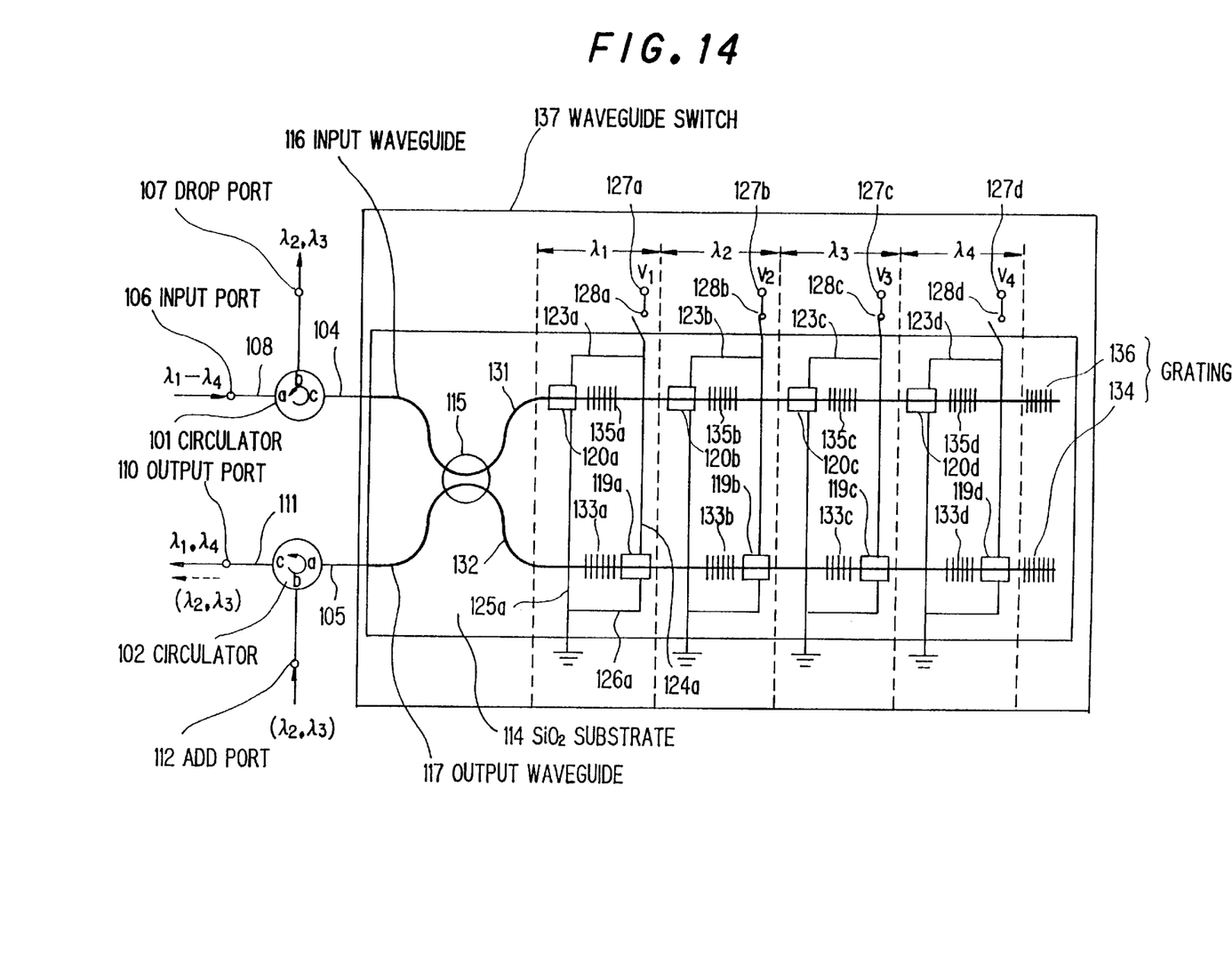
FIG. 14 is a plane view showing an optical device having a switching function in a sixth preferred embodiment according to the invention.

FIG. 14 shows an optical device having a switching function in the sixth preferred embodiments according to the invention, wherein like parts are indicated by like reference numerals as used in FIGS. 10, 13. In the sixth preferred embodiment, a 3 dB coupler 115, four waveguide switches 137a, 137b, 137c and 137d, and a pare of gratings 134, 136 are fabricated and connected in series on a single $SiO_2$ substrate 114, so as to be operated as the optical device having the same function as that in the fifth preferred embodiment shown in FIG. 13. According to the embodiment, it is noted that further smaller size of the device is provided than the device shown in FIG. 8, i.e., 10×60 mm², which is less than approximately one eighth (⅛) of the conventional device having the same function, for example.

According to the above mentioned preferred embodiments, there is an advantage in that flexibilities are more improved than the conventional optical device. In the conventional Add/Drop filter having a switching function of four channels (for the wavelength of $\lambda_1$~$\lambda_4$), it is impossible to enhance the optical device so as to have a switching function of eight channels (for the same wavelength of $\lambda_1$~$\lambda_4$). On the contrary, such enhancement may be possible just by connecting the original waveguide filters having a switching function of four channels (for the wavelength of 1~4) in series.

Preferably, waveguide filters or waveguide switches which are used in the above mentioned preferred embodiments may be fabricated by the following method. For example, a method for fabricating a optical device having a switching function in the first preferred embodiment shown in FIG. 4 will be explained.

First, $SiO_2$—$GeO_2$ film layer for core are deposited on a $SiO_2$ substrate by reactive sputtering. Waveguide patterns are formed by using photolithography and reactive etching technique, then a cladding layer of $SiO_2$—$P_2O_3$—$B_2O_3$ are deposited thereon by flame-deposition. The result shows that the refractive indices of the $SiO_2$ substrate and the core are 1.458 and 1.4657, respectively. The height and width of the core are both 6 $\mu$m.

In such process, utilizing the phenomenon in that irradiation of ultraviolet (UV) light to Ge-doped silica glass causes the change of photo-induced refractive index, if UV light is irradiated on the substrate, periodical changes of refractive indices are induced so as to provide photo-induced gratings. In this case, after hydrogen-processing the waveguide device under the conditions of in 100% hydrogen under atmospheric pressures of 170 at room temperature for 10 days, excimer laser light of wavelength of 248 nm is irradiated on the waveguide through a phase mask. Such technique is described in the literature, for example, Raman Kashyap, "Photosensitive Optical Fibers", Optical Fiber Technology 1, pages 17–34 (1994).

The optical device having such gratings with thin film heaters have been examined. Signal lights of wavelengths of $\lambda_1$=1556 nm, $\lambda_2$=1557 nm, $\lambda_3$=1558 nm and $\lambda_4$=1559 nm are input from the input port 106 at off-state when of thin film heaters 119, 120. The result shows that signal lights of all wavelengths are output from the output port 110 with less than 1 dB loss, and cross-talk to the drop port 107 is less than −25 dB.

The signal lights of the same wavelength are input from the input port 106 at on-state of the thin film heaters are off (consumed power thereof $V_1$=0.2 W at this time). the result is that signal lights of $\lambda_2$, $\lambda_3$ and $\lambda_4$ are output from the Drop port with less than 1 dB loss, cross-talk to the output port 110 is less than −25 dB. In addition to that, when the signal light of wavelength of $\lambda_1$ is input from the add port 112 at off-state of the thin film heaters, cross-talk to the output port 110 is less than −25 dB. At on-state thereof, the input signal light of $\lambda_1$ is output from the output port 110 with less than 1 dB loss.

The materials as a substrate, cladding and core may include other dielectric, semiconductor and organic materials. For producing gratings, other method, such as loading periodical electrodes on waveguides, or varying core shapes periodically may be used. Other metal films, dielectric multiple-layer films may be used as a reflecting film. Besides $Ta_2N$ films, other metal, alloy or dielectric materials may be used as thin film heaters.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An optical device having a switching function, comprising:

an input waveguide and an output waveguide, said input waveguide and said output waveguide being partially disposed to be adjacent each other, thereby forming a 3 dB coupler, a waveguide filter for switching an input signal light including at least one specific wavelength to be transmitted or reflected therein, said waveguide filter including a pair of gratings and phase shift switches provided on extending parts of both said input waveguide and said output waveguide extended from said 3 dB coupler;

a first circulator connected to said input waveguide and having an input port for inputting said input signal light to said waveguide filter, and a drop port for outputting said reflected signal light of said at least one specific wavelength;

a second circulator connected to said output waveguide and having an output port for outputting said transmitted signal light, and an add port for inputting an add signal light of said at least one specific wavelength; and a reflecting film disposed on ends of both said input waveguide and said output waveguide.

2. The optical device having a switching function, according to claim 1, wherein:

said waveguide filter is connected in series to a waveguide filter on a single substrate and disposed between said first circulator and said second circulator.

3. An optical device having a switching function according to claim 1, wherein:

said phase shift switches are thin film heaters.

4. An optical device having a switching function, according to claim 1, wherein:

said gratings are photo-induced gratings fabricated by irradiating ultraviolet light at least on a core of Ge doped silica glass so as to induce periodical change of refractive index.

5. An optical device having a switching function, according to claim 1, wherein:

said 3 dB coupler is a directional coupler.

6. The optical device having a switching function, comprising:

first and second waveguides, said first and second waveguides being partially disposed to be adjacent to each other, thereby forming a 3 dB coupler, first and second gratings provided on said first and second waveguides at one end from said 3 dB coupler, respectively, so as to reflect a signal light of a specific wavelength, third and fourth gratings provided on said first and second waveguides at a back stage of said first and second gratings, respectively, so as to reflect remaining signal lights except for said signal light of a specific wavelength; and first and second phase controllers provided on said first and second waveguides, respectively, for controlling phase of a transmitting light.

7. The optical device having a switching function, according to claim 6, wherein:

said phase controllers are electrically controlled as to shift the phase of light by $\pi/2$.

8. The optical device having a switching function, according to claim 6, wherein said optical device further comprising:

a first circulator having an input port for inputting an input signal light to said 3 dB coupler, and a drop port for outputting a signal light reflected from said 3 dB coupler; and a second circulator having an output port for outputting an signal light output from said 3 dB coupler, and an add port for adding a signal light.

9. The optical device having a switching function, according to claim 6, wherein:

said first and second gratings, and said first and second phase controller are combined so as to provide a waveguide switch, a plurality of said waveguide switches are connected in series so as to provide a multiple switching function.

* * * * *